(12) United States Patent
Alfano et al.

(10) Patent No.: US 12,241,669 B2
(45) Date of Patent: Mar. 4, 2025

(54) SYSTEM AND METHOD FOR DETECTING REFRIGERANT LEAKAGE AND CHARGING A CLIMATE-CONTROL SYSTEM WITH REFRIGERANT

(71) Applicant: Copeland LP, Sidney, OH (US)

(72) Inventors: David A. Alfano, Sidney, OH (US); Winfield S. Morter, Sidney, OH (US); Brian R. Butler, Sidney, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 18/108,139

(22) Filed: Feb. 10, 2023

(65) Prior Publication Data

US 2023/0184473 A1 Jun. 15, 2023

Related U.S. Application Data

(63) Continuation of application No. 16/992,872, filed on Aug. 13, 2020, now Pat. No. 11,604,019.

(51) Int. Cl.
*F25B 45/00* (2006.01)
*F25B 49/02* (2006.01)
*F24F 7/007* (2006.01)

(52) U.S. Cl.
CPC .............. *F25B 45/00* (2013.01); *F25B 49/02* (2013.01); *F24F 7/007* (2013.01);
(Continued)

(58) Field of Classification Search
CPC .......... F25B 2345/003; F25B 2345/006; F25B 2345/007; F25B 2600/07; F25B 2500/22;
(Continued)

(56) References Cited

U.S. PATENT DOCUMENTS 3,786,675 A 1/1974 Delatorre et al.
4,106,306 A * 8/1978 Saunders ................ F25B 45/00
62/149

(Continued)

FOREIGN PATENT DOCUMENTS

JP H05-099540 A 4/1993
JP 2000-028211 A 1/2000
(Continued)

OTHER PUBLICATIONS

International Search Report regarding Application No. PCT/US2021/045573 dated Dec. 7, 2021.
(Continued)

*Primary Examiner* — Jerry-Daryl Fletcher
*Assistant Examiner* — Daniel C Comings
(74) *Attorney, Agent, or Firm* — Harness, Dickey & Pierce, P.L.C.

(57) ABSTRACT

A system for charging an outdoor unit with refrigerant includes a sensor configured to measure a refrigerant concentration and a user device configured to receive the measured refrigerant concentration. The system includes that the user device is configured to, in response to the measured refrigerant concentration exceeding a threshold, generate and display an alert on a user interface of the user device indicating the measured refrigerant concentration exceeds the threshold.

19 Claims, 8 Drawing Sheets

(52) U.S. Cl.
CPC . *F25B 2313/0293* (2013.01); *F25B 2345/003* (2013.01); *F25B 2345/007* (2013.01); *F25B 2500/222* (2013.01); *F25B 2600/112* (2013.01)

(58) Field of Classification Search
CPC .......... F25B 2500/222; F25B 2345/001; F25B 11/36; F25B 2500/001
See application file for complete search history.

(56) References Cited

U.S. PATENT DOCUMENTS

| | | | |
|---|---|---|---|
| 4,459,844 | A | 7/1984 | Burkhart |
| 4,484,452 | A * | 11/1984 | Houser, Jr. .............. F25B 45/00 62/149 |
| 4,879,546 | A | 11/1989 | Dunham et al. |
| 5,214,412 | A | 5/1993 | Gavlak et al. |
| 5,249,434 | A * | 10/1993 | Abraham ................ F25B 45/00 62/149 |
| 5,889,199 | A | 3/1999 | Wong et al. |
| 6,085,531 | A * | 7/2000 | Numoto .................. F24F 11/36 62/149 |
| 6,141,977 | A | 11/2000 | Zugibe |
| 6,198,400 | B1 | 3/2001 | Church et al. |
| 6,362,741 | B1 | 3/2002 | Hickox et al. |
| 6,644,047 | B2 | 11/2003 | Taira et al. |
| 6,647,761 | B2 | 11/2003 | Barjesteh |
| 6,772,598 | B1 | 8/2004 | Rinehart |
| 7,022,993 | B1 | 4/2006 | Williams, II et al. |
| 7,289,918 | B2 | 10/2007 | Nagase |
| 8,783,049 | B2 * | 7/2014 | Gloeckner ......... H05K 7/20836 236/44 R |
| 9,280,516 | B2 * | 3/2016 | Jiang ....................... H04L 67/12 |
| 9,625,195 | B2 | 4/2017 | Hiraki et al. |
| 10,337,949 | B2 | 7/2019 | Augusto |
| 10,514,176 | B2 | 12/2019 | Weinert |
| 10,557,838 | B2 | 2/2020 | Worth |
| 2002/0178738 | A1 * | 12/2002 | Taira ....................... F24F 11/30 62/181 |
| 2007/0000310 | A1 | 1/2007 | Yamartino et al. |
| 2013/0103350 | A1 | 4/2013 | Jiang et al. |
| 2013/0213068 | A1 | 8/2013 | Goel et al. |
| 2015/0241316 | A1 | 8/2015 | Ulrich et al. |
| 2016/0178229 | A1 | 6/2016 | Chen et al. |
| 2019/0061465 | A1 | 2/2019 | Hs |
| 2019/0170383 | A1 | 6/2019 | Weinert |
| 2019/0186769 | A1 | 6/2019 | Zimmermann |
| 2019/0212177 | A1 * | 7/2019 | Passaniti ................... G01P 5/22 |
| 2020/0018307 | A1 * | 1/2020 | Boll ........................ F25B 45/00 |
| 2020/0248919 | A1 * | 8/2020 | Green ...................... F24F 11/58 |
| 2021/0003332 | A1 | 1/2021 | Nakagawa et al. |

FOREIGN PATENT DOCUMENTS

| | | |
|---|---|---|
| JP | 2003-279203 A | 10/2003 |
| JP | 2003-322445 A | 11/2003 |
| JP | 2008-298335 A | 12/2008 |
| JP | 2010-249326 A | 11/2010 |
| JP | 2014016138 A | 1/2014 |
| JP | 2015-148400 A | 8/2015 |
| JP | 5916546 B2 | 5/2016 |
| KR | 20130090087 A | 8/2013 |
| KR | 101727540 B1 | 4/2017 |
| WO | 2017/163321 A1 | 9/2017 |

OTHER PUBLICATIONS

Written Opinion of the ISA regarding Application No. PCT/US2021/045573 dated Dec. 7, 2021.
Non-Final Office Action regarding U.S. Appl. No. 16/992,872 dated Jan. 5, 2022.
Final Office Action regarding U.S. Appl. No. 16/992,872 dated Jul. 1, 2022.
Japanese Office Action regarding Application No. 2023-509830, dated Jan. 30, 2024.
Search Report regarding European Patent Application No. 218566545, dated Apr. 4, 2024.
Office Action regarding Japanese Patent Application No. 2023-509830, dated Jul. 2, 2024.

* cited by examiner

SYSTEM AND METHOD FOR DETECTING REFRIGERANT LEAKAGE AND CHARGING A CLIMATE-CONTROL SYSTEM WITH REFRIGERANT

CROSS-REFERENCE TO RELATED APPLICATIONS

This application is a continuation of U.S. patent application Ser. No. 16/992,872 filed on Aug. 13, 2020. The entire disclosure of the above application is incorporated herein by reference.

FIELD

The present disclosure relates to a heating, ventilation, and air conditioning (HVAC) system and more particularly to refrigerant leak detection during refrigerant charging of an HVAC system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Most commonly used industrial gases contribute to the worldwide buildup of greenhouse gases in Earth's atmosphere, accelerating the rate of global warming. Worldwide there has been an ongoing push to limit the use of refrigerants with high global warming potential (GWP).

Even though A1 refrigerants (nontoxic and not flammable) have traditionally been used in HVAC and refrigeration systems, A2L refrigerants (nontoxic and partially flammable) are replacing A1 refrigerants in commercial and residential buildings due to the reduced impact on global warming. While A2L refrigerants are only partially flammable due to reduced propagation, A2L refrigerants still pose a combustion risk.

SUMMARY

In a feature, a system for charging an outdoor unit with refrigerant includes a sensor configured to measure a refrigerant concentration and a user device configured to receive the measured refrigerant concentration. The system includes that the user device is configured to, in response to the measured refrigerant concentration exceeding a threshold, generate and display an alert on a user interface of the user device indicating the measured refrigerant concentration exceeds the threshold.

In further features, the system includes a refrigerant manifold connected to the outdoor unit via a first hose and a second hose, and a refrigerant container connected to the refrigerant manifold via a third hose. The refrigerant container is configured to store refrigerant.

In further features, the system includes a refrigerant scale. The refrigerant container is located on the refrigerant scale and the refrigerant scale wirelessly transmits a measured refrigerant weight to the user device.

In further features, the system includes a solenoid arranged along the third hose. The solenoid is configured to block refrigerant from flowing from the refrigerant container to the refrigerant manifold in response to the solenoid being actuated. In further features, the user device is configured to actuate the solenoid in response to the measured refrigerant concentration exceeding the threshold.

In further features, the refrigerant manifold, the solenoid, the sensor, and the user device are configured to communicate wirelessly.

In further features, the system includes a first temperature probe connected to the first hose and configured to measure a first temperature, a second temperature probe connected to the second hose and configured to measure a second temperature, a first pressure sensor configured to measure a first pressure, and a second pressure sensor configured to measure a second pressure. In further features, the refrigerant manifold is configured to receive the first temperature, the second temperature, the first pressure, and the second pressure, calculate a subcooling value and a superheat value based on the first temperature, the second temperature, the first pressure, and the second pressure, open the solenoid for a threshold time in response to the subcooling value being below a subcooling threshold corresponding to the outdoor unit, and open the solenoid for the threshold time in response to the superheat value being above a superheat threshold corresponding to the outdoor unit.

In further features, the refrigerant manifold is configured to receive and display temperature data on an interface of the refrigerant manifold, and the temperature data is received from a first temperature probe attached to the first hose and a second temperature probe attached to the second hose.

In further features, the system includes an outside air temperature sensor configured to measure an outside air temperature and a storage database configured to store, for outdoor units, at least one of: a subcooling value, a superheat value, and an indoor coil temperature split value. In further features, the user device is configured to obtain and storing the outside air temperature, obtain, for the outdoor unit, at least one of: a corresponding subcooling value, a corresponding superheat value, and a corresponding indoor coil temperature split value from the storage database, and calculate at least one of: a present subcooling value, a present superheat value, and a present indoor coil temperature split value based on measurements of a first sensor and a second sensor. In further features, the user device is configured to, in response to at least one of: (i) the present subcooling value matching the corresponding subcooling value, (ii) the present superheat value matching the corresponding superheat value, and (iii) the present indoor coil temperature split value matching the corresponding indoor coil temperature split value, generate and display an alert indicating the outdoor unit is charged.

In further features, the system includes a lockout relay connecting a compressor of the outdoor unit to power. In further features, the user device is configured to actuate the lockout relay to disconnect the compressor from the power in response to the measured refrigerant concentration exceeding the threshold.

In further features, the system includes a circulator blower configured to circulate air. In further features, the user device is configured to transmit a control signal to a thermostat to actuate the circulator blower in response to the measured refrigerant concentration exceeding the threshold.

In further features, the system includes a compressor of the outdoor unit. In further features, the user device is configured to transmit a control signal to a thermostat to disconnect the compressor from power in response to the measured refrigerant concentration exceeding the threshold.

In further features, the system includes a first sensor located to measure a return air temperature and humidity and a second sensor located to measure a supply air temperature and humidity. In further features, the first sensor and the second sensor are configured to wirelessly transmit the return air temperature and humidity and the supply air temperature and humidity to the user device.

In further features, the system includes an indoor coil located within an indoor compartment. In further features, the sensor is located within the indoor compartment, the indoor coil is located indoors, and the outdoor unit is located outdoors.

In further features, the system includes a wired sensor configured to measure a second refrigerant concentration located near an indoor coil. In further features, the user device receives the measured second refrigerant concentration from the wired sensor, receives the measured refrigerant concentration from the sensor, and, in response to a difference between the measured second refrigerant concentration and the measured refrigerant concentration being greater than a calibration threshold, generates and displays an alert on the user device.

In a feature, a method for charging an outdoor unit with refrigerant includes measuring, via a sensor, a refrigerant concentration. The method includes receiving, via a user device, the receive the measured refrigerant concentration and, in response to the measured refrigerant concentration exceeding a threshold, generating and displaying an alert on a user interface of the user device indicating the measured refrigerant concentration exceeds the threshold.

In further features, the method includes wirelessly transmitting, from a refrigerant scale, a measured refrigerant weight of a refrigerant container to the user device.

In further features, a refrigerant manifold is connected to the outdoor unit via a first hose and a second hose, the refrigerant container is connected to the refrigerant manifold via a third hose, and the refrigerant container configured to store refrigerant.

In further features, the method includes, in response to the measured refrigerant concentration exceeding the threshold, actuating, using the user device, a solenoid. In further features, the solenoid is arranged along the third hose, and the solenoid blocks refrigerant from flowing from the refrigerant container to the refrigerant manifold in response to the solenoid being actuated.

In further features, the refrigerant manifold, the solenoid, the sensor, and the user device communicate wirelessly.

In further features, the method includes receiving, by the refrigerant manifold, a first temperature, a second temperature, a first pressure, and a second pressure. In further features, a first temperature probe is connected to the first hose and measure the first temperature, a second temperature probe is connected to the second hose and measures the second temperature, a first pressure sensor measures the first pressure, and a second pressure sensor measures the second pressure. In further features, the method includes calculating, by the refrigerant manifold, a subcooling value and a superheat value based on the first temperature, the second temperature, the first pressure, and the second pressure. In further features, the method includes opening the solenoid for a threshold time in response to the subcooling value being below a subcooling threshold corresponding to the outdoor unit. In further features, the method includes opening the solenoid for the threshold time in response to the superheat value being above a superheat threshold corresponding to the outdoor unit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
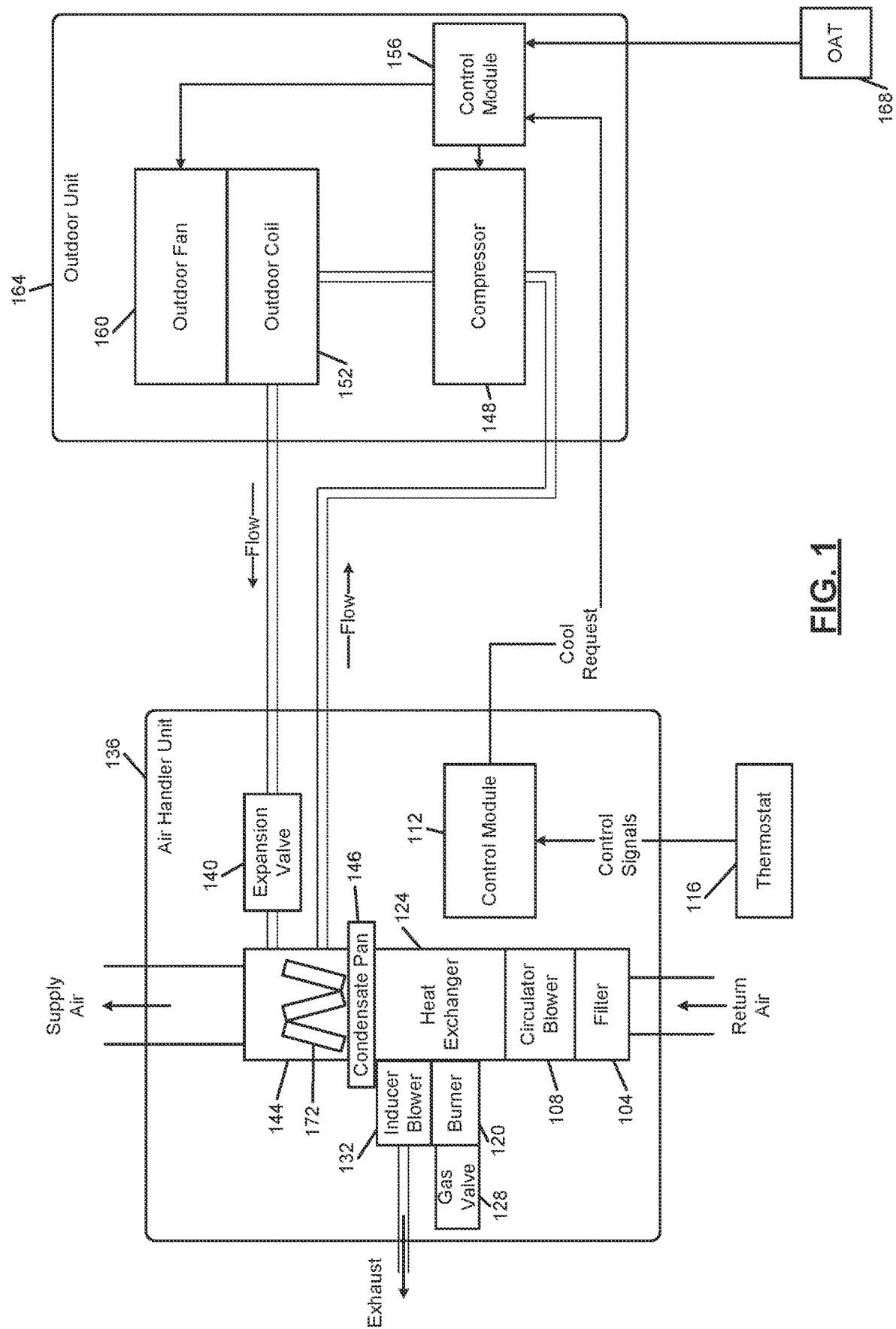
FIG. 1 is a block diagram of an example heating, ventilation, and air conditioning (HVAC) system.

According to the present disclosure, a refrigerant charging system is configured to detect a refrigerant leak during charging of a heating, ventilation, and air conditioning (HVAC) system, and notify a technician of the leak. In various implementations, the refrigerant charging system stops the flow of additional refrigerant into the HVAC system by closing a lockout solenoid, blocking refrigerant from entering a refrigeration circuit of the HVAC system. The refrigerant charging system includes a refrigerant manifold and a user device, both brought by the technician. The user device may be a mobile computing device, such as a cell phone, tablet, laptop, etc. The refrigerant manifold is configured to connect a refrigerant container to a liquid line and a vapor line of an outdoor unit in order to add refrigerant to the outdoor unit. The lockout solenoid is arranged between the refrigerant manifold and the refrigerant container. The refrigerant manifold, the user device, and the lockout solenoid may include wireless capabilities in order to receive and transmit data and control signals. In various implementations, the refrigerant manifold, the user device, and the lockout solenoid may be wired due to safety precautions.

With the push to adopt low GWP refrigerants, in particular partially flammable A2Ls in residential and commercial settings, the safety of such changes has increasingly risen to the forefront. While regulations and technologies aimed at mitigating dangers associated with a running an A2L system have received considerable attention, little focus has been given to a dangerous point in the life cycle of an HVAC system: charging the HVAC system with refrigerant. Charging a cooling/refrigeration system typically involves one technician adding refrigerant at the outdoor unit outdoors until a combination of pressure and temperature readings and subsequent calculated metrics reach a desired or sufficient value.

The refrigerant charging process often takes time and requires continuous changes and monitoring. As such, most technicians will remain outdoors for the duration of the charging process. Currently, technicians have no means to detect if a refrigerant leak were to occur inside a home or commercial facility during this process, resulting in potentially dangerous levels of partially flammable refrigerants in a building. To combat this possibility, the refrigerant charging system detects a refrigerant leak and alerts a technician of the refrigerant leak. In various implementations, the refrigerant charging system locks down or blocks additional refrigerant from entering the HVAC system to avoid a potentially dangerous buildup of partially flammable refrigerant.

The refrigerant charging system may include multiple, portable sensors that the technician places throughout the HVAC system. The sensors at least include a portable leak sensor and may additionally include portable temperature sensors located indoors and portable temperature probes attached outdoors. The sensors include a transmitter to wirelessly transmit sensor measurements to the refrigerant manifold, the user device, and/or a thermostat. When a technician begins charging an HVAC system with refrigerant, the portable leak sensor is placed inside the building at points most likely to experience a leak. Optional relays or lockout solenoids can be connected to mitigation and charging equipment to lockout the refrigerant charging system and mitigate in the event of a leak. The HVAC system status can be monitored through the user device, which can wirelessly receive measurements and statuses from all of the described refrigerant charging system components. The user device can include logic configured to determine and calculate efficiency information, such as superheat and subcooling, about the HVAC system based on measurements and receive updates regarding the status of a refrigerant leak. Additionally, all the measurements can be stored in a storage database.

In various implementations, the user device wirelessly receives a refrigerant concentration measured by the portable leak sensor. The user device includes lockout control logic that compares the measured refrigerant concentration to a threshold refrigerant concentration, for example, 25% of a lower flammability limit (LFL) or a lower explosive limit (LEL). In response to the measured refrigerant concentration exceeding the threshold, control generates and wirelessly transmits an actuation instruction to the lockout solenoid. The lockout solenoid closes when actuated to block additional refrigerant from flowing from the refrigerant container to the refrigerant manifold and then to the outdoor unit and indoors (where the portable leak sensor is placed). In various implementations, the lockout control logic includes mitigation control, such as instructing the blower to turn on by transmitting a corresponding control signal to the wireless thermostat or other control device.

In various implementations, the refrigerant charging system may only generate an alert on the user device in response to detecting a refrigerant leak. The alert instructs the technician to stop charging the outdoor unit with refrigerant. In other implementations, instead of or in addition to actuating the lock out solenoid, the refrigerant charging system can turn off a compressor of the outdoor unit via the thermostat or using a lockout relay arranged along the AC and or control signal lines powering the compressor. The lockout relay may be wired or capable of wirelessly communicating with the user device, the thermostat, and the refrigerant manifold.

The technician can set up the refrigerant charging system with: the portable leak sensor next to an indoor coil (acting as an evaporator during cooling) of the HVAC system (where the indoor system is most likely to experience a leak), one portable temperature sensor arranged to measure the temperature of the supply air, and another portable temperature sensor arranged to measure the temperature of return air. The portable temperature sensors may also include a humidity sensor, a particulate matter sensor, a volatile compound sensor, a formaldehyde sensor, a carbon dioxide sensor, a radon sensor, etc. The portable sensors may wirelessly transmit measurements obtained to the user device or refrigerant manifold for display as well as to a storage database.

The portable temperature probes are connected to a liquid line and a vapor line of the outdoor unit of the HVAC system, while the air handler unit (as well as supply air ductwork and return air ductwork) is indoors. The portable temperature probes also wirelessly communicate temperature measurements to, for example, the refrigerant manifold or the user device. The refrigerant manifold includes a user interface and pressure sensors within the chambers of the refrigerant manifold. The refrigerant manifold is configured to add refrigerant from the refrigerant container to the outdoor unit. In various implementations, the refrigerant manifold includes logic to add an amount of refrigerant based on the requirements of the specific outdoor unit and the received temperature and pressure measurements.

The refrigerant manifold receives the measured temperatures of the temperature probes for display on the user interface of the refrigerant manifold along with pressure measurements within the vapor chamber and the liquid chamber of the refrigerant manifold. The refrigerant manifold also receives an outside air temperature (OAT) from an OAT sensor. The lockout solenoid not only stops the flow of refrigerant into the refrigeration circuit of the HVAC system, but also controls the flow of refrigerant into the refrigeration circuit based on design criteria of the particular HVAC system. In various implementations, the outdoor unit of the HVAC system includes a label or a sticker adhered to the outdoor unit. The label includes design criteria for the HVAC system. In various implementations, the outdoor unit of the HVAC system may include a charging chart that correlates the OAT to expected system pressures. Therefore, the expected system pressures may be determined from the OAT.

In an example, the label of the outdoor unit may indicate to the technician to aim to charge the system to 13° F. subcooling during cooling mode. In various implementations, the calculation for subcooling is a saturated liquid temperature less a liquid line temperature. The saturated liquid temperature is a function of the liquid line pressure measured by the refrigerant manifold sensor and the type of refrigerant used, and the liquid line temperature is also a value measured directly by the refrigerant manifold sensor. If the subcooling is below the target value, the lockout solenoid is opened (by the technician or automatically via control signals) to allow additional refrigerant to flow into the refrigeration circuit. If the calculated subcooling is above the target, the technician would have to recover refrigerant out of the system using a system recovery pump.

In various implementations, the refrigerant manifold may also calculate superheat, a metric used to verify an expansion device of the HVAC system is operational, and an indoor coil temperature split. If all of these calculated values fall within the design criteria included on the label of the outdoor unit, the HVAC system is considered to be properly charged. In some instances, technicians will not measure or calculate any of the described values and instead will only calculate the amount of refrigerant that is expected to be included in the HVAC system (typically a function of refrigeration line length) and simply weigh-in that calculated amount using a refrigerant scale.

In an example, the outdoor unit may include a bar code or a QR code on the label on the outside of the outdoor unit. The technician can scan the label with the user device (for example, using a camera of the user device) to determine at what subcooling, temperature, pressure, etc. (based on the combination of the portable temperature probes, the portable temperature sensors, and pressure sensors) should be when the refrigeration circuit is fully charged. Along with other design criteria, the label may include a subcooling value, an amount of refrigerant that was factory charged, design/test pressure gauge amounts, and maximum design/working pressure. In various implementations, the refrigerant manifold receives the scanned information and may generate an alert when the various measurements indicate the outdoor unit is charged with sufficient or an optimal amount of refrigerant.

In various implementations, the HVAC system may include a leak sensor wired into the HVAC system, for example, next to the indoor coil, that was factory installed. Therefore, the technician can also test the effectiveness of the wired leak sensor by placing the portable leak sensor next to the wired leak sensor and leaking some refrigerant in the area. While the technician brings the portable leak sensor to ensure that the measured refrigerant concentration is accurate, the technician can also test to make sure the wired leak sensor is functional (measuring similar refrigerant concentrations to the portable leak sensor) and performing correct mitigation functionality.

Block Diagrams

FIG. 1 is a block diagram of an HVAC system. In this particular example, a forced air system with a gas furnace is shown. Return air is pulled from a building through a filter 104 by a circulator blower 108. The circulator blower 108, also referred to as a fan, is controlled by a control module 112. The control module 112 receives signals from a thermostat 116. For example, the thermostat 116 may include one or more setpoint temperatures specified by the user. The thermostat 116 may include a temperature sensor and a humidity sensor.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The thermostat 116 provides the heat and/or cool requests to the control module 112. In various implementations, the thermostat 116 communicates with components of the HVAC system using a web-based Application Programming Interface (API). When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an indoor compartment 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

As shown in FIG. 1, the HVAC system includes a split air conditioning system. Refrigerant is circulated through a compressor 148, a condenser/outdoor coil 152, the expansion valve 140, and an indoor coil 172 of the indoor compartment 144. In cooling, the indoor coil 172 acts as an evaporator and the outdoor coil 152 acts as a condenser. In heat mode, the indoor coil 172 becomes a condenser and the outdoor coil 152 becomes the evaporator.

The indoor compartment 144 is a compartment including the indoor coil 172. The indoor compartment 144 is placed in series with the supply air so that when cooling is desired, the indoor coil 172 removes heat from the supply air, thereby cooling the supply air. During cooling, the indoor coil 172 is circulating refrigerant making the indoor coil 172 cold (e.g., below the dew point of the air within the building), which causes water vapor to condense. This water vapor is collected in the condensate pan 146, which is drained or is pumped out.

A control module 156 receives a cool request from the control module 112 and controls the compressor 148 accordingly. The control module 156 may also control an outdoor fan 160, which increases heat exchange between the outdoor coil 152 and outside air. In such a split system, the compressor 148, the outdoor coil 152, the control module 156, and the outdoor fan 160 are generally located outside of the building, often in a single outdoor unit 164 or condensing unit.

In various implementations, the control module 156 may include a run capacitor, a start capacitor, and a contactor or relay. In various implementations, the start capacitor may be omitted, such as when the outdoor unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for cooling. The compressor 148 may vary its capacity according to the cool request.

The electrical lines provided to the outdoor unit 164 may include a 240 volt mains power line and a 24 volt switched control line. The 24 volt control line may correspond to the cool request shown in FIG. 1. The 24 volt control line controls operation of the control module 112 and the control module 156. When the control line indicates that the compressor 148 should be on, the control module 156 operates a set of switches to connect the 240 volt power supply to a motor of the compressor 148 or to connect the motor of the compressor 148 to a drive to operate the compressor 148. In addition, the control module 156 may connect the 240 volt power supply to the outdoor fan 160. In various implementations, such as when the outdoor unit 164 is located in the ground as part of a geothermal system, the outdoor fan 160 may be omitted. The 240 volt mains power supply arrives in two legs, as is common in the U.S., both of the legs connect to the motor of the compressor 148.

When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set to a setpoint temperature + and − a threshold amount (e.g., 1, 2, 3, 4, 5 degrees fahrenheit), respectively. The setpoint temperature may be set to a temperature by default and may be adjusted via receipt of user input. The threshold amount may be set by default and may be adjusted via receipt of user input.

In various implementations, the control module 156 or thermostat 116, may receive signals from an OAT sensor 168. The thermostat 116 may be a WiFi thermostat having networking capability. In various implementations, the OAT sensor 168 may be located within an enclosure, shielded from direct sunlight, and/or exposed to an air cavity that is not directly heated by sunlight. Alternatively or additionally, online (including Internet-based via the thermostat 116) weather data based on the geographical location of the building may be used to determine sun load, OAT, relative humidity, particulate, VOCs, carbon dioxide, etc.

In various implementations, the air handler unit 136 may include a transformer (shown in FIG. 3) connected to an incoming AC power line in order to provide AC power to the control module 112 and the thermostat 116. For example, the transformer may be a 10-to-1 transformer and therefore provide either a 12V or 24V AC supply depending on whether the air handler unit 136 is operating on nominal 120 volt or nominal 240 volt power. Additionally or alternatively, the transformer may be a 5-to-1 transformer to provide 24V AC supply if the air handler is operating on nominal 120 volt power.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from the indoor coil 172.

One or more of these control signals (on the control lines) is also transmitted to the outdoor unit 164. In various implementations, the outdoor unit 164 may include an ambient temperature sensor that generates temperature data. When the outdoor unit 164 is located outdoors, the ambient temperature represents an outside (or outdoor) ambient temperature. The temperature sensor supplying the ambient temperature may be located outside of an enclosure of the outdoor unit 164.

Figure 2:
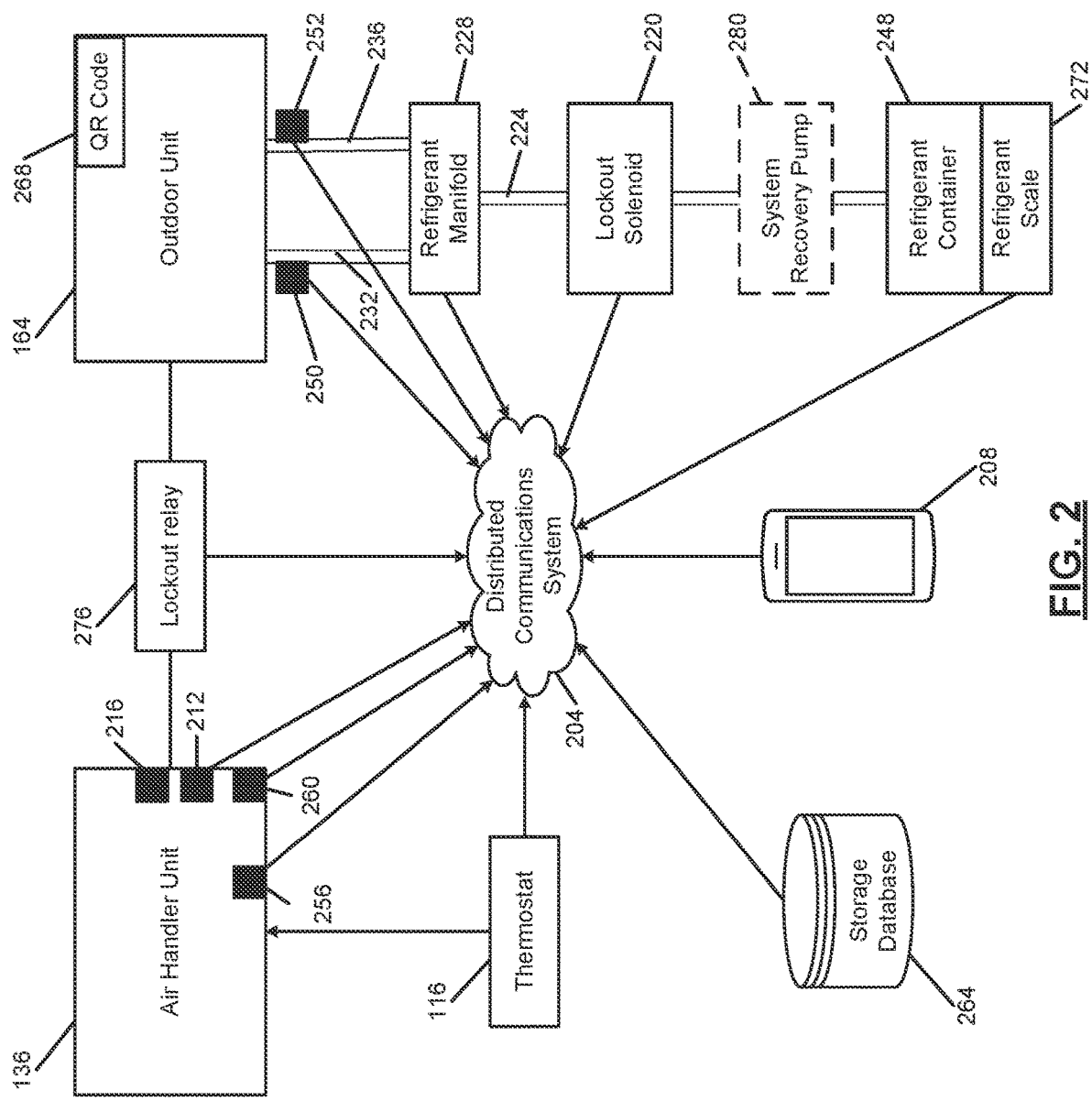
FIG. 2 is a high-level block diagram of a refrigerant charging system for an example HVAC system.

FIG. 2 is a high-level block diagram of a refrigerant charging system for an example HVAC system. As noted previously, the components of the refrigerant charging system are wirelessly connected via a distributed communications system 204. The components of the refrigerant charging system may communicate via the distributed communications system 204 using wireless protocols such as Wi-Fi, cellular, ZigBee, Z-Wave, Bluetooth, Thread, 6LoWPAN, LoRa, EnOcean, etc. Additionally, the wired communication methods of the refrigerant charging system include, but are not limited to, Modbus, UART, Ethernet, RS-232, RS-485, USB, SPI, I2C, and CAN.

A user device 208 receives a refrigerant concentration measured by a portable leak sensor 212. The technician places the portable leak sensor 212 near a wired leak sensor 216 (if included in the system). As mentioned previously, the technician may test the wired leak sensor 216 when the portable leak sensor 212 is placed near the wired leak sensor 216 to ensure that the wired leak sensor 216 is operating and mitigating properly. Testing of the wired leak sensor 216 may occur before or after the technician charges the HVAC system with refrigerant.

Figure 3:
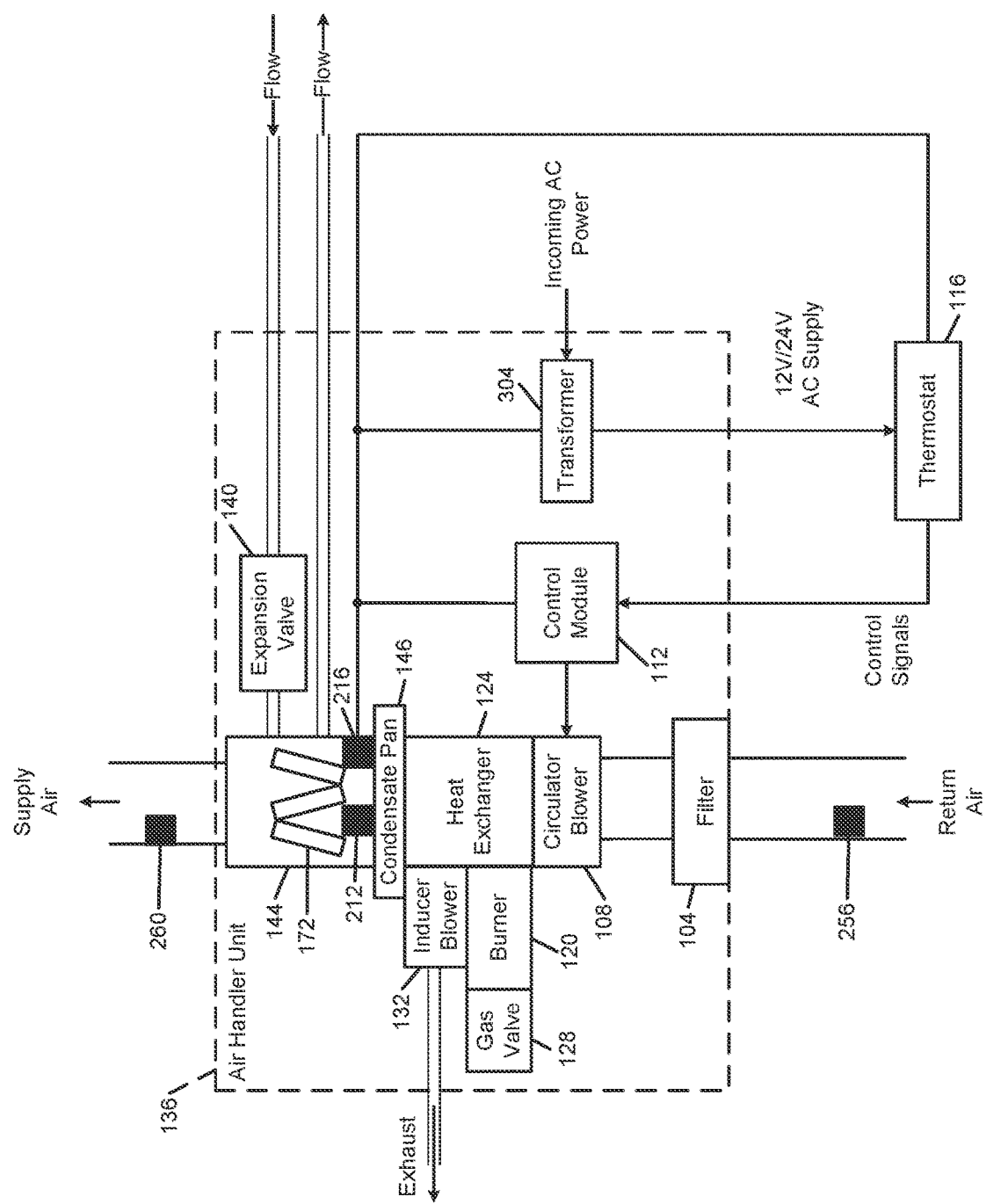
FIG. 3 is a block diagram of an air handler unit of an example HVAC system.

As shown in FIG. 3, the leak sensors are placed near the indoor coil 172. To test that the wired leak sensor 216 is operating properly, the technician releases a small amount of a target gas (for example, A2L refrigerant) directly next to the wired leak sensor 216 and the portable leak sensor 212 placed near the indoor coil 172. In various implementations, the control module 112 receives the measurements from the wired leak sensor 216 and the user device 208 receives measurements from the portable leak sensor 212. Due to the wireless connectivity between the user device 208 and the thermostat 116, the user device 208 may also receive the measurements of the wired leak sensor 216.

The technician may compare the measurements of the wired leak sensor 216 and the portable leak sensor 212 to determine whether the wired leak sensor 216 is properly calibrated. Since the portable leak sensor 212 is brought by the technician and regularly calibrated, the portable leak sensor 212 is presumed to be accurate. Therefore, if the wired leak sensor 216 measurement varies from the portable leak sensor 212 measurement, the technician can adjust the wired leak sensor 216 output to match that of the trusted portable leak sensor 212. The user device 208 may receive refrigerant concentration measurements from both the portable leak sensor 212 and the wired leak sensor 216 and calculate a difference. If the difference exceeds a calibration threshold, for example, if the measurements differ by more than 1% of the LFL, the user device 208 may generate and display an alert, indicating to the technician that appropriate adjustment of the wired leak sensor 216 should be performed. In various implementations, the technician may adjust the wired leak sensor 216 by adjusting a potentiometer or through digital means. Moreover, the technician can verify that mitigation activation performs as expected when the wired leak sensor 216 is exposed to the target gas or refrigerant.

The portable leak sensor 212 wirelessly transmits the measured refrigerant concentration to the user device 208 via the distributed communications system 204. In various implementations, the portable leak sensor 212 is continuously transmitting the measured refrigerant concentration. The user device 208 determines whether the refrigerant concentration exceeds the threshold, and, if the refrigerant concentration is above the threshold, the user device 208 displays an alert to the technician indicating the leak. In various implementations, the determination whether the refrigerant concentration exceeds the threshold may be performed by the refrigerant manifold 228 or control logic located on a device separate from the refrigerant charging system, the refrigerant charging system transmitting and receiving data from the device via the distributed communications system 204. In various implementations, the user device 208 may simply receive and display data.

In various implementations, the user device 208 also generates and transmits an actuation control signal to a lockout solenoid 220 arranged along a refrigerant line hose 224 to stop the flow of refrigerant to the outdoor unit 164. When a technician is charging an HVAC system with refrigerant, the technician connects a refrigerant manifold 228 to the outdoor unit using a liquid line hose 232 and a vapor line hose 236. The refrigerant manifold 228 receives refrigerant from a refrigerant container 248 when the lockout solenoid 220 is disengaged or open, allowing refrigerant to flow from the refrigerant container 248 to the refrigerant manifold 228. In various implementations, the refrigerant manifold 228 may charge the system with refrigerant from the refrigerant container 248 using a single hose implementation.

The technician allows the refrigerant to flow via the vapor line hose 236 to charge the outdoor unit 164 with refrigerant. In various implementations, the technician may allow the refrigerant to flow via the liquid line hose 232. The technician also uses the refrigerant manifold 238 to measure the pressure (via pressure sensors or pressure gauge) of a vapor chamber and a liquid chamber (connecting the corresponding hoses to the refrigerant manifold 228). Further, the refrigerant manifold 228 wirelessly receives a liquid line temperature from a first temperature probe 250 and a vapor line temperature from a second temperature probe 252. Both temperature probes 250 and 252 are portable, brought by the technician, and placed on the corresponding lines.

The refrigerant manifold 228 also wirelessly receives temperature and humidity measurements of a return air temperature and humidity from a first temperature and humidity sensor 256 and a supply air temperature and humidity from a second temperature and humidity sensor 260. As noted previously, the first temperature and humidity sensor 256 and the second temperature and humidity sensor 260 may include carbon dioxide sensors, volatile organic compound sensors, etc. The first temperature and humidity sensor 256 and the second temperature and humidity sensor 260 are placed indoors by the technician and may also transmit sensed data wirelessly to the user device 208. The sensed data may also be recorded in a storage database 264, along with location information, customer information, and a timestamp. The term database may refer to any form of structured or unstructured data storage with the ability to insert data and query and/or aggregate data based on various parameters. For example, the technician may notice, from the user interface of the user device 208, that the levels of carbon dioxide within the supply air is undesirable and communicate such information to the customer to suggest a repair or part replacement of the HVAC system.

The refrigerant manifold 228 receives temperature data from the first temperature probe 250, the second temperature probe 252, the first temperature and humidity sensor 256, and the second temperature and humidity sensor 260. Additionally, the technician may obtain specific refrigerant charging information about the outdoor unit 164 by scanning a label 268, such as a QR code, affixed or adhered to the outdoor unit 164. The technician may scan the label 268 using the user device 208. The user device 208 may obtain the outdoor unit 164 information from the storage database 264 that corresponds to the label 268 identifier, including an optimal temperature difference between the first temperature probe 250 and the second temperature probe 252, an optimal return air temperature and humidity (from the first temperature and humidity sensor 256), an optimal supply air temperature and humidity (from the second temperature and humidity sensor 260), and an optimal pressure of the outdoor unit 164. Based on the above data, the technician can compare the optimal information for the outdoor unit 164 to the data received and displayed on the refrigerant manifold 228 to determine when the outdoor unit 164 is sufficiently or optimally charged.

In various implementations, the refrigerant manifold 228 may include lockout logic configured to send an alert to the user device 208 when the amount of refrigerant charged into the outdoor unit 164 has reached a sufficient level based on the temperature and pressure measurements. The lockout controller 404 slowly adds refrigerant via the refrigerant manifold 228 to the outdoor unit 164. For example, the lockout controller 404 may control the lockout solenoid 220 to open for a period, such as two seconds. Then, the lockout controller 404 controls the lockout solenoid 220 to close to receive updated refrigerant concentration measurements. Based on the updated refrigerant concentration measurements, the lockout controller 404 reevaluates whether additional refrigerant should be added to the outdoor unit 164. The refrigerant manifold 228 may indicate on the refrigerant manifold interface when the outdoor unit 164 is sufficiently charged. In various implementations, the user device 208 may receive an indication that the outdoor unit 164 is sufficiently charged and actuate the lockout solenoid 220 to prevent the flow of additional refrigerant to the outdoor unit 164.

The refrigerant container 248 may be placed on a refrigerant scale 272 to measure the weight of the refrigerant container 248. The refrigerant scale 272 may continuously and wirelessly transmit a weight of the refrigerant container 248 to the user device 208. In various implementations, the weight is transmitted at the beginning of the refrigerant charging and at the end. The user device 208 may determine the amount of refrigerant added to the outdoor unit based on the difference in weight at the beginning and at the end. The technician can then calculate the cost of the refrigerant based on the amount added. Additionally, the user device 208 may transmit the amount of refrigerant added to the storage database 264, including the location, customer, and time. Storing the amount of refrigerant added to various HVAC systems is important as such data can be tracked or monitored by various government organizations to determine GWP impact.

In various implementations, the user device 208 may also provide HVAC system suggestions based on sensor data received from the first temperature and humidity sensor 256 and the second temperature and humidity sensor 260. For example, if the first temperature and humidity sensor 256 and the second temperature and humidity sensor 260 include a particulate matter sensor and transmit a particulate matter count above a desirable threshold, the user device 208 may display the particulate matter count and recommend replacing the return air filter or installing a better return air filter. Similarly, if the first temperature and humidity sensor 256 and the second temperature and humidity sensor 260 include a humidity sensor and the humidity is low, the user device 208 may display a recommendation for a humidifier.

The technician may also have a lockout relay 276 along the power lines connected between the air handler unit 136 and the outdoor unit 164. The lockout relay 276 may interrupt the power lines and wirelessly receive control signals to prevent power the HVAC system (specifically the compressor) from being powered when the refrigerant concentration measured by the portable leak sensor 212 exceeds the threshold. As discussed in more detail in FIG. 7, the lockout relay 276 may operate as an encoder/decoder module. Turning off the compressor prevents refrigerant from being pumped indoors. In various implementations, the threshold may be 25% of the LFL for the refrigerant within an area. The threshold of the portable leak sensor 212 may be varied based on a size of a space where the portable leak sensor 212 is located.

The refrigerant charging system may also include a system recovery pump 280 when the HVAC system includes too much refrigerant. Therefore, when charging the HVAC system, the system recovery pump 280 would be excluded. However, when the refrigerant charging system is operating to remove excess refrigerant, the system recovery pump 280 is connected and operates as a vacuum to the liquid line hose 232 and/or vapor line hose 236 to remove or recover refrigerant from the refrigeration circuit of the HVAC system in order to reach a sufficient or optimal charge level according to subcooling, superheat, indoor coil temperature split, etc. The system recovery pump 280 may also be used to remove refrigerant when the HVAC system needs repairs or replacement parts.

A vacuum pump (not shown) may be used during HVAC system installation to remove moisture or gas in either line that is not refrigerant as moisture or other gas will cause the outdoor unit 164 to not operate properly. Additionally, the vacuum pump may be used to perform a leak check by identifying vacuum decay over time. In various implementations, the lockout solenoid 220 may include a micron gauge to ensure the proper level of vacuum. The system recovery pump 280 may operate to remove refrigerant from the HVAC system. As was true with adding refrigerant, when removing refrigerant, the refrigerant scale 272 can measure a difference in weight to determine an amount of recovered refrigerant. Additionally, the technician can compare, based on previously stored information (from the storage database 264), whether the amount of recovered refrigerant matches the amount previously added.

FIG. 3 is a block diagram of an air handler unit of an example HVAC system. In many systems, the air handler unit 136 is located inside the building, while the outdoor unit 164 is located outside the building. The present disclosure is not limited to that arrangement, however, and applies to other systems including, as examples only, systems where the components of the air handler unit 136 and the outdoor unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the outdoor unit 164 may be located near the earth, such as in a basement, crawlspace, garage, or on the first floor, such as when the first floor is separated from the earth by only a concrete slab.

In FIG. 3, a transformer 304 can be connected to an AC line in order to provide AC power to the control module 112 and the thermostat 116. The HVAC system components receive power from the transformer 304 via the thermostat 116. For example, the transformer 304 may provide 24V AC power to the HVAC system components, including the control module 112 and thermostat 116. The control module 112 controls operation in response to signals from the thermostat 116 received over control lines. The control lines may include a call for cool (cool request), a call for heat (heat request), and a call for fan (fan request). The control lines may include a line corresponding to a state of a reversing valve in heat pump systems.

The wired leak sensor 216 is located within the indoor compartment 144 by the indoor coil 172. The indoor compartment 144 is a compartment including the indoor coil 172. The wired leak sensor 216 may include a leak sensor and a relay. The leak sensor measures a refrigerant concentration within the indoor compartment 144. The leak sensor measures the concentration of A2L, a nontoxic and lower flammable refrigerant. However, the leak sensor may instead measure a refrigerant that is nontoxic and not flammable refrigerant, such as A1; a refrigerant that is nontoxic and flammable, such as A2; a refrigerant that is nontoxic and highly flammable, such as A3; or similar versions of refrigerants that are toxic.

Figure 6B:
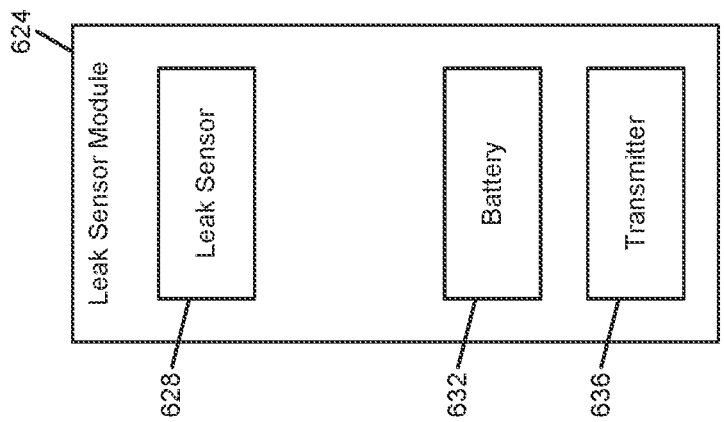
FIG. 6B is a block diagram of a leak sensor module.

The leak sensor measures a refrigerant concentration as a percent of refrigerant in a known space-here, the indoor compartment 144. The technician places the portable leak sensor 212 near the wired leak sensor 216. The portable leak sensor 212 includes a leak sensor, a battery, and a wireless transmitter (as shown in FIG. 6B). The portable leak sensor 212 transmits the refrigerant concentration to the user device 208.

The user device 208 generates an alert and may actuate the lockout solenoid 220 in response to a percent of refrigerant within the compartment or space defining the portable leak sensor 212 exceeding the LFL or the LEL. Both limits represent a lower end of a percent concentration of a refrigerant or any flammable gas that can be ignited when mixed with air. For example, the portable leak sensor 212 can actuate the lockout solenoid 220 to close in response to the measured refrigerant concentration exceeding 25% of the LFL for the given refrigerant.

Once the portable leak sensor 212 measures a refrigerant concentration above the threshold, the user device 208 is notified and the lockout solenoid 220 may be actuated. In various implementations the lockout relay 276 is opened and disconnects the power from the HVAC system components, such as the compressor to prevent additional refrigerant from flowing inside. In various implementations, the user device 208 may wirelessly transmit a control signal to the thermostat 116 to instruct the circulator blower 108 to turn on to mitigate the refrigerant leak. Additionally, the technician may control the lockout solenoid 220, the lockout relay 276, and the circulator blower 108 (via the thermostat 116) to return to normal operation upon repairing the leak. As shown in FIG. 3, the first temperature and humidity sensor 256 is placed along the return air pathway and the second temperature and humidity sensor 260 is along the supply air pathway.

Figure 4:
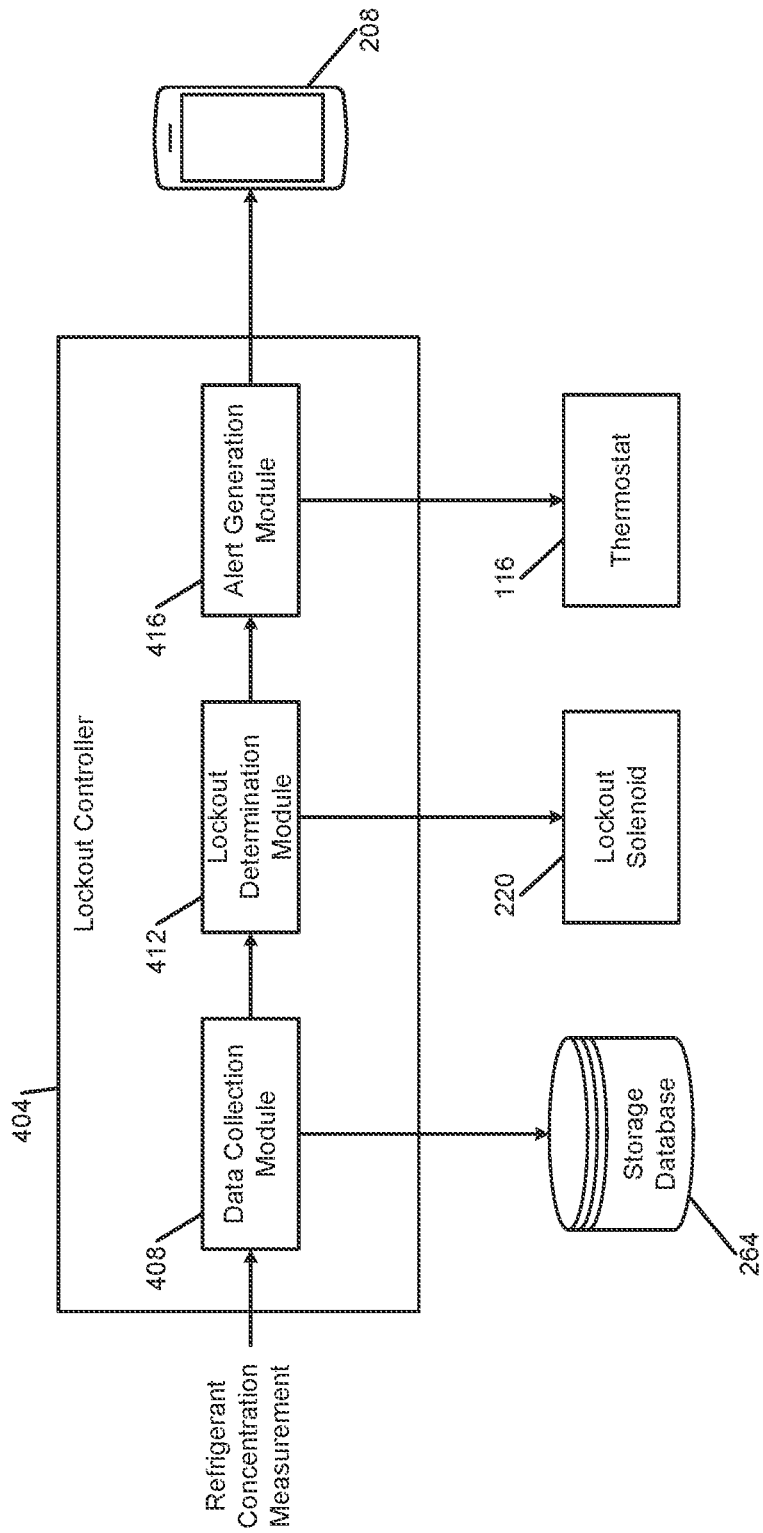
FIG. 4 is a functional block diagram of a lockout controller of an example HVAC system.

FIG. 4 is a functional block diagram of a lockout controller 404 of an example HVAC system. The lockout controller 404 as described may be stored on a memory of the user device 208 implemented by a processor of the user device 208. In various implementations, the lockout controller 404 is stored on a memory of and operated by a processor of the refrigerant manifold 228. Additionally or alternatively, the lockout controller 404 is operated by a separate device integrated into the distributed communication system 204. A data collection module 408 of the lockout controller 404 receives a refrigerant concentration measurement from the portable leak sensor 212. The data collection module 408 may wirelessly store refrigerant concentration measurements in the storage database 264. The data collection module 408 forwards the refrigerant concentration measurement to a lockout determination module 412. The lockout determination module 412 compares the refrigerant concentration to the threshold.

In response to the threshold being exceeded, the lockout determination module 412 generates and transmits an actuation instruction to the lockout solenoid 220. Then, the lockout determination module 412 forwards the generated instruction to an alert generation module 416. The alert generation module 416 generates and transmits an indication to the user device 208. In various implementations, the lockout controller 404 only generates and transmits the indication to the user device 208 to prompt the technician the stop charging and find the refrigerant leak. In various implementations, the alert generation module 416 forwards the indication to the thermostat 116. The thermostat 116 then transmits a control signal to the circulator blower 108 to turn on. As mentioned previously, the lockout controller 404 may also actuate the lockout relay 276 when a leak is detected to turn off the compressor. In various implementations, the lockout controller 404 may cut power to the compressor via the thermostat 116 as needed if a leak is identified during automated charging.

Figure 5:
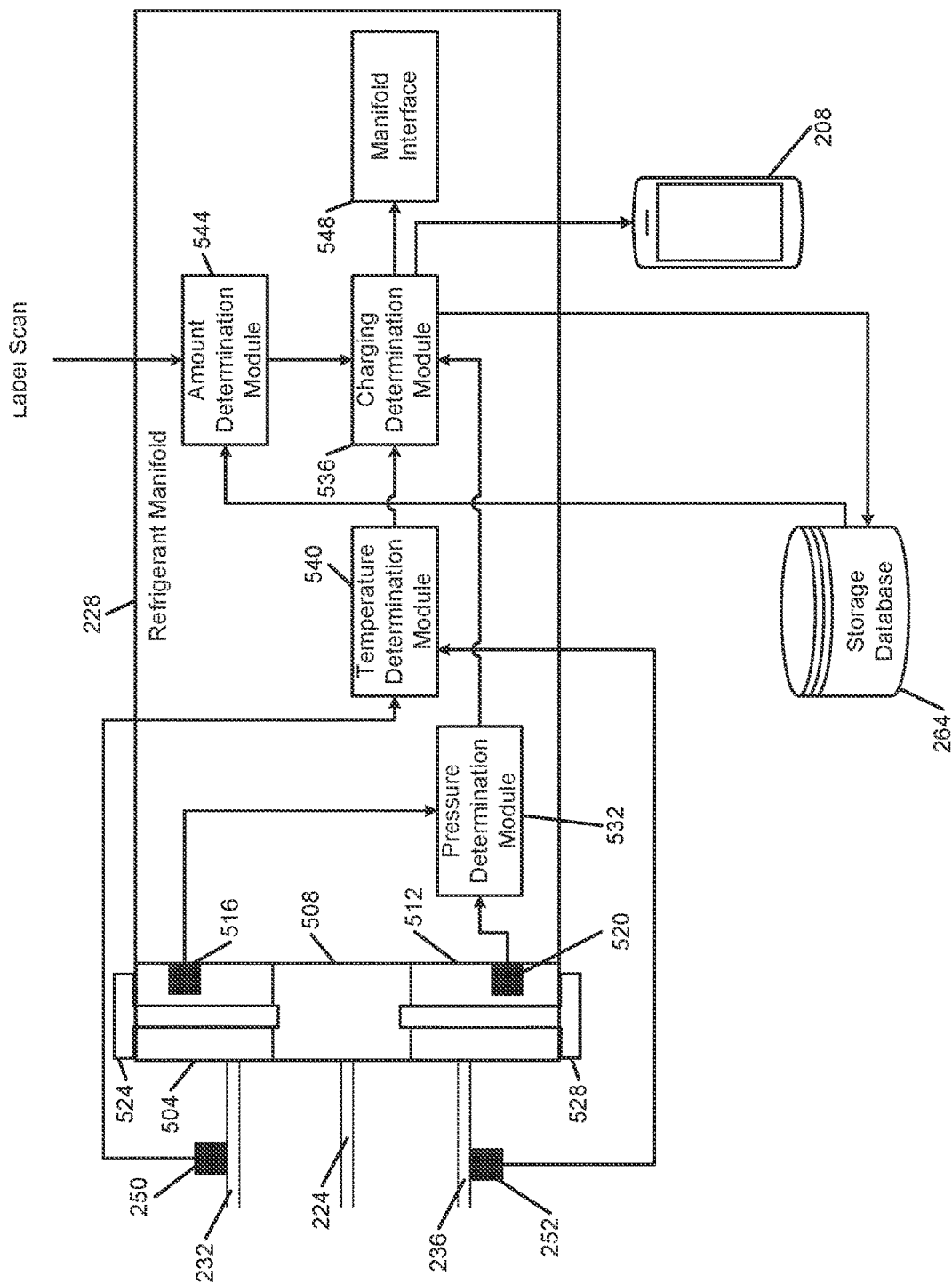
FIG. 5 is a functional block diagram of a refrigerant manifold of an example HVAC system.

FIG. 5 is a functional block diagram of a refrigerant manifold 228 of an example HVAC system. In various implementations, the lockout controller 404 logic is incorporated into the refrigerant manifold 228 to control the flow of refrigerant into the outdoor unit 164 to slowly reach the optimal amount of refrigerant in the refrigeration circuit. The refrigerant manifold 228 includes instructions stored in a memory of the refrigerant manifold 228 implemented by a processor of the refrigerant manifold 228. The refrigerant manifold 228 includes a liquid chamber 504, a refrigerant chamber 508, and a vapor chamber 512. The liquid chamber 504 includes a liquid pressure sensor 516 (or could instead include a liquid pressure gauge) and the vapor chamber 512 includes a vapor pressure sensor 520 (or could instead include a vapor pressure gauge). In various implementations, add-on in-line pressure transducers may be added to the refrigerant charging system instead of using the incorporated pressure sensors 516 and 520. A liquid dial 524 can be moved to allow refrigerant to flow from the refrigerant line hose 224 to the liquid line hose 232 to the outdoor unit 164. A vapor dial 528 operates similarly.

A pressure determination module 532 receives measured pressure from the liquid pressure sensor 516 and the vapor pressure sensor 520. The pressure determination module 532 forwards the pressure data to a charging determination module 536. A temperature determination module 540 wirelessly receives temperature data from the first temperature probe 250 and the second temperature probe 252. In various implementations, the temperature determination module 540 may also wirelessly receive temperature data regarding the supply air and return air from the first temperature and humidity sensor 256 and the second temperature and humidity sensor 260.

The temperature determination module 540 forwards the temperature data to the charging determination module 536. The charging determination module 536 receives multiple measurements, including temperature and pressure data. The measurements the charging determination module 536 receives are raw values that may be used to calculate metrics for the HVAC system, such as a subcooling value, a superheat value, an indoor coil temperature split value, an indoor to outdoor temperature split value, etc. Many of the above calculations depend on a type of refrigerant used in the HVAC system.

An amount determination module 544 obtains label scan information about the outdoor unit 164. The label scan information may be received from the user device 208 (after scanning of the label) or scanned by the refrigerant manifold 228. In various implementations, the described control performed by the refrigerant manifold 228 may be performed by the user device 208. Further, any values not automatically obtained from the label scan information may be manually entered into the charge determination module 536, including but not limited to pressures, temperatures, charge targets, etc. The amount determination module 544 obtains metrics from the storage database 264 corresponding to the label scan information including charging information for the corresponding outdoor unit 164. The metrics correspond to the temperature and pressure measurements of the HVAC system, indicating at what temperature and pressure the HVAC system has the optimal or a sufficient amount of refrigerant.

The refrigerant charging system is configured to, automatically or manually, charge the HVAC system until the optimal values of the subcooling, superheat, etc. are within a particular range (the range indicated on the label). However, out-of-range values may indicate problems in the system. For example, if subcooling is at the target value or within the optimal range and the vapor pressure in the system is low, the HVAC system may have a low airflow. Therefore, while the charging determination module 536 may fully automate the refrigerant charging process by slowly adding refrigerant to the HVAC system based on optimal value ranges, the charging determination module 536 may also identify potential system faults based on variations in the received measurements. In such a case, the charging determination module 536 may generate an alert indicating to the technician of a possible fault and, in various implementations, provide instructions for fixing the fault.

The metrics are forwarded to the charging determination module 536. The charging determination module 536 determines if additional refrigerant is needed or not based on the metrics, the temperature data, and the pressure data. In various implementations, the charge determination module 536 may determine that the HVAC system or refrigerant circuit includes an excess amount of refrigerant and instruct the technician (via a user interface of the refrigerant manifold 228 or user device 208) to connect the system recovery pump 280 to recover the excess amount of refrigerant. The determination, along with sensor data, may be stored on the storage database 264. Additionally, the charging determination module 536 may present the determination indicating whether the refrigerant charging is complete on a manifold interface 548 and/or the user device 208. In various implementations, the control logic described on the refrigerant manifold 228 may be incorporated as instructions included in the user device 208. In various implementations, the manifold interface 548 may display instructions for the technician to direct the technician through the refrigeration charging process. For example, the amount determination module 544 may forward the label scan information to the charging determination module 536, which displays incremental instructions to the technician based on the sensor measurements.

Figure 6A:
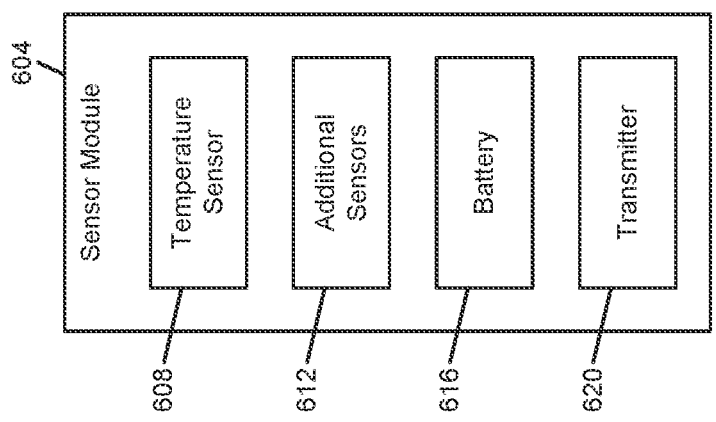
FIG. 6A is a block diagram of a sensor module.

FIG. 6A is a block diagram of a sensor module 604. The first temperature probe 250, the second temperature probe 252, the first temperature and humidity sensor 256, and the second temperature and humidity sensor 260 may be implemented as the sensor module 604. The sensor module 604 includes a temperature sensor 608, additional sensors 612, a battery 616, and a transmitter 620. In various implementations, the sensor module 604 may exclude the additional sensors 612 (as described above, a humidity sensor, carbon dioxide sensor, etc.). The transmitter 620 is configured to wirelessly transmit temperature measurements of the area in which the sensor module 604 is placed. FIG. 6B is a block diagram of a leak sensor module 624. The portable leak sensor 212 may be implemented as the leak sensor module 624. The leak sensor module 624 includes a leak sensor 628, a battery 632, and a transmitter 636. As mentioned previously, the leak sensor 628 measures a refrigerant concentration and the transmitter 636 wirelessly transmits the measured refrigerant concentration to other devices, such as the user device 208.

Figure 7:
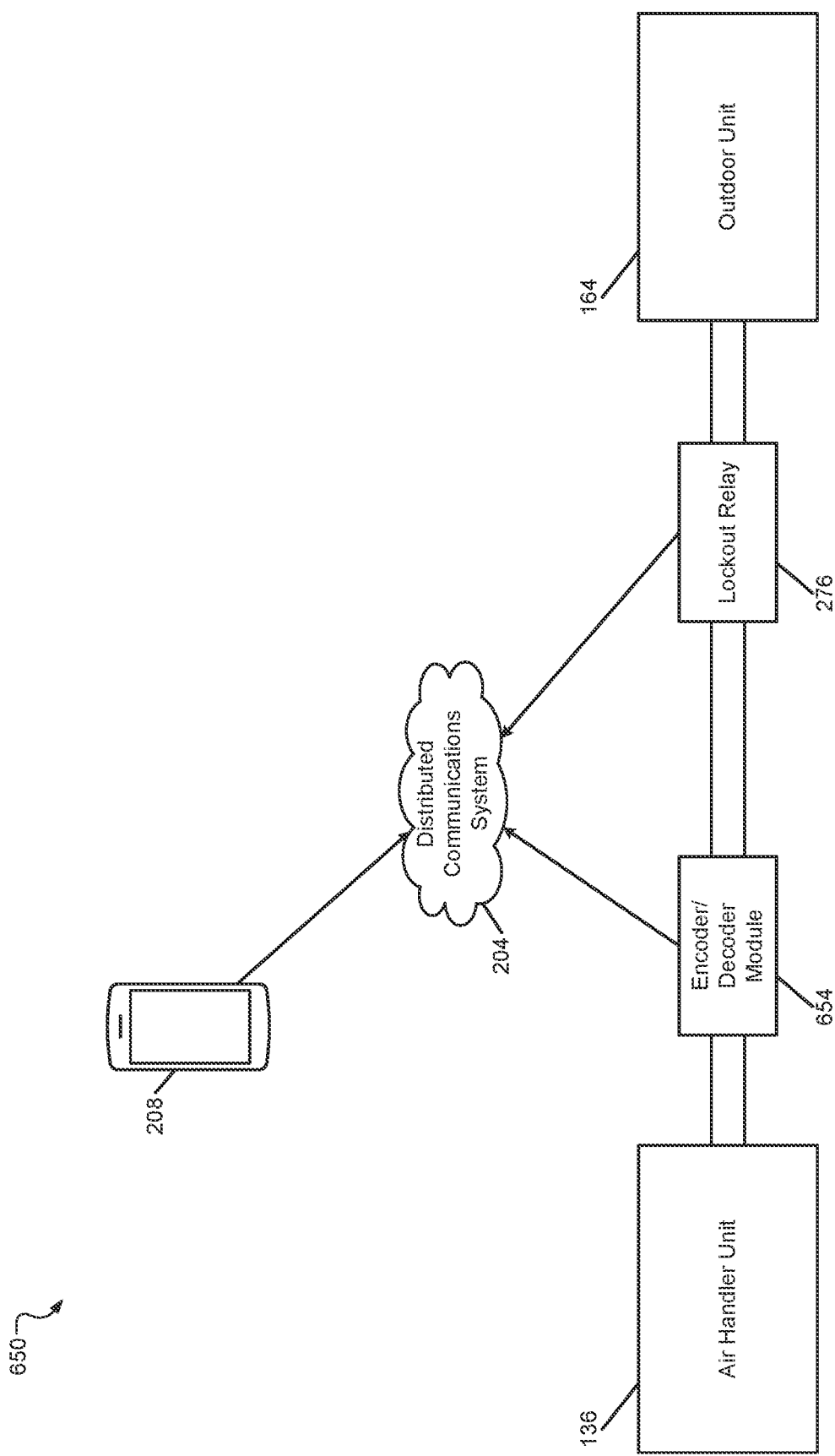
FIG. 7 is a block diagram of a digital communication system between components of an HVAC system.

FIG. 7 is a block diagram of a digital communication system 650 between components of an HVAC system. In traditional HVAC systems, outdoor components, such as the outdoor unit 164, are connected to indoor components, such as the air handler unit 136, through a two wire connection, supplying power to the outdoor unit 164 based on signals from the thermostat 116. As is described above, the refrigerant charging system of the present disclosure may operate using wireless signals between various components. To charge an HVAC system with refrigerant when the HVAC system cannot communicate wirelessly (for example, due to distance), the digital communication system 650 repurposes the two wire connection as a digital communication bus between the lockout relay 276 and an encoder/decoder module 654.

The lockout relay 276 may operate as an encoder/decoder or another encoder/decoder module may be included outdoors. In various implementations, the encoder/decoder module 654 may be included in the air handler unit 136. The encoder/decoder module 654 receives analog signals from indoor components within the air handler unit 136, such as the circulator blower 108, and the lockout relay 276 receives analog signals from outdoor components of the outdoor unit 164, such as the compressor 148. The lockout relay 276 is configured to convert the analog signals from outdoor components into digital signals and transmit those signals digitally to the encoder/decoder module 654.

The encoder/decoder module 654 performs the same conversion to communicate analog signals from indoor components into digital form to the lockout relay 276. Both the lockout relay 276 and the encoder/decoder module 654 can then convert received digital signals into analog signals and transmit those signals to the outdoor components (e.g., outdoor unit 164) and the indoor components (e.g., air handler unit 136), respectively. Additionally, the lockout relay 276 and the encoder/decoder module 654 are able to communicate wirelessly to the user device 208 (as well as the thermostat 116 and other wireless components described above) via the distributed communications system 204.

In various implementations, the encoder/decoder module 654 may be configured to activate the circulator blower 108. For example, the encoder/decoder module 654 may have a plurality of auxiliary connections or relays (not shown) that can connect to various indoor components through, for example, the control module 112 to directly actuate those indoor components via the encoder/decoder module 654. Additionally, a separate device (not shown) may connect to an auxiliary connection of the encoder/decoder module 654 and the control module 112 to directly actuate the circulator blower 108.

Flowchart

Figure 8:
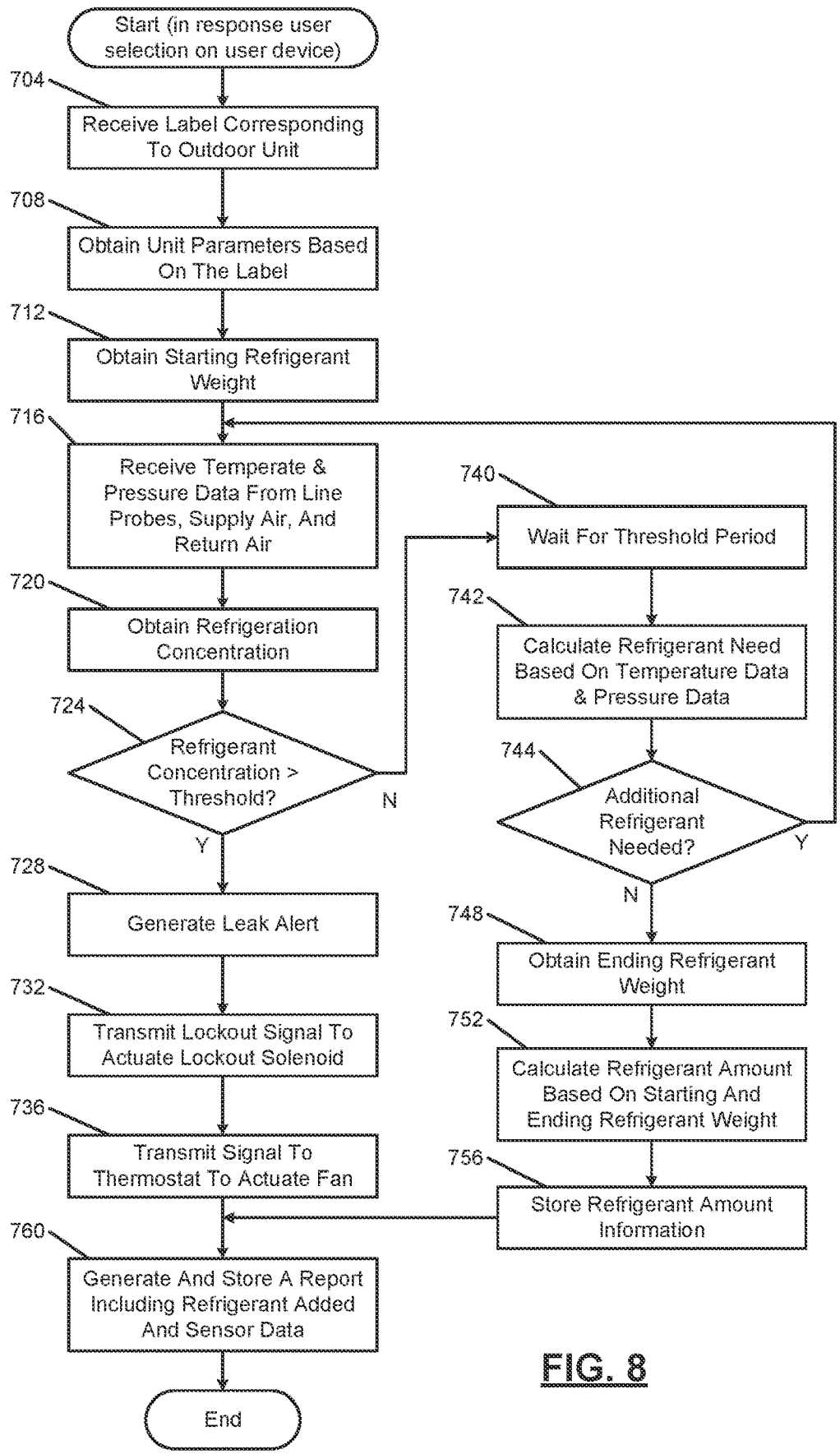
FIG. 8 is a flowchart depicting example operation of an example refrigerant charging system of an HVAC system.

FIG. 8 is a flowchart depicting example operation of an example refrigerant charging system of an HVAC system. Control begins in response to receiving a user selection on the user device that the refrigerant charging system is connected. As most of the components of the refrigerant charging system communicate wirelessly and need to be connected or placed at various locations in the HVAC system, the technician selects on the user device that the refrigerant charging system is connected. Control proceeds to 704 to receive a label corresponding to the outdoor unit 164. In various implementations, the user device may include a scanner, operated via a camera, to read the label affixed to the outdoor unit 164.

Control continues to 708 to obtain outdoor unit parameters based on the label. The outdoor unit parameters may be obtained from the storage database 264. Control proceeds to 712 to obtain a starting refrigerant weight from the refrigerant scale 272. Control continues to 716 to receive temperature and pressure data from line probes, and temperature data from supply air, and return air probes. In various implementations, control only obtains a subset of the temperature/pressure data. Control proceeds to 720 to obtain a refrigerant concentration from the portable leak sensor 212.

Control continues to 724 to determine if the refrigerant concentration is above the threshold. If yes, control continues to 728 to generate a leak alert for display on the user device 208. Control proceeds to 732 to transmit a lockout signal to actuate the lockout solenoid 220. Control continues to 736 to transmit a signal to the thermostat 116 to actuate the fan (circulator blower 108). In various implementations, control may only alert of the leak and not actuate the lockout solenoid 220 or the fan. Then, control ends.

Otherwise, if at 724, control determines that the refrigerant concentration is below the threshold, control proceeds to 740. At 740, control waits for a threshold period. Because refrigerant is added slowly to the refrigerant circuit, for example, in five second intervals, control waits for the threshold period, for example, three minutes, until proceeding to 742. At 742, control calculates a refrigerant need based on temperature data and pressure data. In various implementations, calculating the refrigerant need compares the unit parameters to presently measured temperature and pressure measurements.

Then, control proceeds to 744. At 744, control determines if additional refrigerant is needed based on the calculated refrigerant need. If yes, control returns to 716. Otherwise, control proceeds to 748 to obtain an ending refrigerant weight from the refrigerant scale 272. Then, control continues to 752 to calculate a refrigerant amount based on starting and ending refrigerant weight. Control proceeds to 756 to store the refrigerant amount information. Additionally, control may calculate a cost of the refrigerant amount and transmit the cost to the user device 208. Control continues to 760 to generate and store a report including an amount of refrigerant added and sensor data. The report may include customer information, location information, the amount of refrigerant added and at what time intervals, and sensor data throughout the charging process, including: temperature, pressure, humidity, etc. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for charging a climate-control system with refrigerant, the method comprising:
  measuring, via a sensor, a refrigerant concentration of refrigerant leaked from a refrigeration circuit of the climate-control system;

receiving, via a user device, the measured refrigerant concentration of refrigerant leaked from the refrigeration circuit;

connecting the user device to a solenoid that controls refrigerant flow from a refrigerant container to an outdoor unit of the climate-control system;

transmitting, via the user device, a control signal in response to the measured refrigerant concentration of refrigerant leaked from the refrigeration circuit exceeding a threshold, wherein the control signal causes the solenoid to move to a closed position to prevent refrigerant flow from the refrigerant container to the outdoor unit; and transmitting, via the user device, another control signal to a thermostat to actuate a blower in response to the measured refrigerant concentration exceeding the threshold, wherein the blower is disposed in an indoor air handler unit of the climate-control system and is configured to force air across a coil of a heat exchanger disposed within the indoor air handler unit.

2. The method of claim 1, further comprising wirelessly transmitting, from a refrigerant scale, a measured refrigerant weight of the refrigerant container to the user device.

3. The method of claim 1, wherein the solenoid, the sensor, and the user device communicate wirelessly.

4. The method of claim 1, further comprising:
connecting the refrigerant container to a refrigerant manifold; and
connecting the refrigerant manifold to the outdoor unit via a first hose and a second hose.

5. The method of claim 4, wherein the solenoid is disposed along a third hose connecting the refrigerant container with the refrigerant manifold.

6. The method of claim 4, further comprising receiving, in the user device, a first temperature, a second temperature, a first pressure, and a second pressure, wherein:
a first temperature probe is connected to the first hose and measures the first temperature,
a second temperature probe is connected to the second hose and measures the second temperature,
a first pressure sensor measures the first pressure, and
a second pressure sensor measures the second pressure.

7. The method of claim 6, further comprising:
calculating a subcooling value and a superheat value based on the first temperature, the second temperature, the first pressure, and the second pressure;
opening the solenoid for a threshold time in response to the subcooling value being below a subcooling threshold; and
opening the solenoid for the threshold time in response to the superheat value being above a superheat threshold.

8. A charging system for charging a climate-control system with refrigerant, the charging system comprising:
a sensor configured to measure a refrigerant concentration of refrigerant leaked from a refrigeration circuit of the climate-control system; and
a user device configured to:
receive the measured refrigerant concentration of refrigerant leaked from the refrigeration circuit of the climate-control system;
actuate a solenoid configured to control refrigerant flow from a refrigerant container to an outdoor unit of the climate-control system; and
in response to the measured refrigerant concentration of refrigerant leaked from the refrigeration circuit of the climate-control system exceeding a threshold, close the solenoid to block refrigerant from flowing from the refrigerant container to the outdoor unit, wherein the user device is configured to transmit a control signal to a thermostat to actuate a blower in response to the measured refrigerant concentration exceeding the threshold, and wherein the blower is disposed in an indoor air handler unit of the climate-control system and is configured to force air across a coil of a heat exchanger disposed within the indoor air handler unit.

9. The charging system of claim 8, wherein:
the solenoid opens for a threshold time in response to a subcooling value being below a subcooling threshold, and
the solenoid opens for the threshold time in response to a superheat value being above a superheat threshold.

10. The charging system of claim 8, further comprising a refrigerant scale, wherein when the refrigerant container is positioned on the refrigerant scale, the refrigerant scale wirelessly transmits a measured refrigerant weight to the user device.

11. The charging system of claim 8, wherein the user device is configured to wirelessly communicate with the solenoid and the sensor.

12. The charging system of claim 8, further comprising a refrigerant manifold connected to the refrigerant container and configured to be connected to the outdoor unit via a first hose and a second hose, wherein the solenoid is disposed along a third hose connecting the refrigerant container with the refrigerant manifold.

13. The charging system of claim 12, further comprising:
a first temperature probe connected to the first hose and configured to measure a first temperature;
a second temperature probe connected to the second hose and configured to measure a second temperature;
a first pressure sensor configured to measure a first pressure; and
a second pressure sensor configured to measure a second pressure, wherein the refrigerant manifold is configured to:
receive the first temperature, the second temperature, the first pressure, and the second pressure,
calculate a subcooling value and a superheat value based on the first temperature, the second temperature, the first pressure, and the second pressure.

14. The charging system of claim 13, wherein:
the refrigerant manifold is configured to receive and display the first and second temperatures on an interface of the refrigerant manifold,
the first temperature probe is attached to the first hose, and
the second temperature probe is attached to the second hose.

15. The charging system of claim 14, further comprising:
an outside air temperature sensor configured to measure an outside air temperature; and
a storage database configured to store, for a plurality of outdoor units, at least one of: a subcooling value, a superheat value, and an indoor coil temperature split value, wherein the user device is configured to:
obtain and storing the outside air temperature;
obtain, for the outdoor unit, at least one of: a corresponding subcooling value, a corresponding superheat value, and a corresponding indoor coil temperature split value from the storage database;
calculate at least one of: a present subcooling value, a present superheat value, and a present indoor coil temperature split value based on measurements of a first sensor and a second sensor; and in response to at least one of: (i) the present subcooling value matching the corresponding subcooling value, (ii) the present superheat value matching the corresponding superheat value, and (iii) the present indoor coil temperature split value matching the corresponding indoor coil temperature split value, generate and display an alert indicating the outdoor unit is charged.

16. The charging system of claim 15, wherein the first sensor is configured to measure a return air temperature and humidity and the second sensor is configured to measure a supply air temperature and humidity, and wherein the first sensor and the second sensor are configured to wirelessly transmit the return air temperature and humidity and the supply air temperature and humidity to the user device.

17. The charging system of claim 8, further comprising a lockout relay connecting a compressor of the outdoor unit to power, wherein the user device is configured to actuate the lockout relay to disconnect the compressor from the power in response to the measured refrigerant concentration exceeding the threshold.

18. The charging system of claim 8, wherein the user device is configured to transmit a control signal to the thermostat to disconnect a compressor of the outdoor unit from power in response to the measured refrigerant concentration exceeding the threshold.

19. The charging system of claim 8, further comprising a wired sensor configured to measure a second refrigerant concentration at the coil of the heat exchanger disposed within the indoor air handler unit, wherein the user device:

receives the measured second refrigerant concentration from the wired sensor, receives the measured refrigerant concentration from the sensor, and in response to a difference between the measured second refrigerant concentration and the measured refrigerant concentration being greater than a calibration threshold, generates and displays an alert on the user device.

* * * * *